United States Patent [19]

Kumakawa et al.

[11] E Re. 29,917

[45] Reissued Feb. 20, 1979

[54] LOGIC CIRCUIT EQUIVALENT TO A RELAY CONTACT CIRCUIT

[75] Inventors: Yosihiko Kumakawa, Zushi; Kunio Ikai, Tokyo, both of Japan

[73] Assignee: Naigai Industries, Inc., Tokyo, Japan

[21] Appl. No.: 726,401

[22] Filed: Sep. 24, 1976

Related U.S. Patent Documents

Reissue of:

[64] Patent No.: 3,890,512
Issued: Jun. 17, 1975
Appl. No.: 422,689
Filed: Dec. 7, 1973

[30] Foreign Application Priority Data

Sep. 13, 1973 [JP] Japan ..... 48-106631

[51] Int. Cl.[2] ..... H03K 19/08

[52] U.S. Cl. ..... 307/203; 307/213; 307/218; 307/297

[58] Field of Search ..... 307/203, 213, 218, 207, 307/208, 215, 297

[56] References Cited

U.S. PATENT DOCUMENTS

| | | | |
|---|---|---|---|
| 2,939,907 | 6/1960 | Redpath et al. | 307/218 |
| 2,999,947 | 9/1961 | Dean | 307/203 |
| 3,036,222 | 6/1962 | Witt | 307/203 |
| 3,105,923 | 10/1963 | Rose et al. | 307/218 |
| 3,201,601 | 8/1965 | Chevalier et al. | 307/218 |
| 3,201,682 | 8/1965 | Johnson | 307/297 |
| 3,235,786 | 2/1966 | Gaskill | 307/297 |
| 3,523,198 | 8/1970 | Keller | 307/297 |
| 3,538,443 | 11/1970 | Tague | 307/203 |
| 3,579,089 | 5/1971 | Giess | 323/22 T |
| 3,679,915 | 7/1972 | Kriger | 307/218 |
| 3,774,051 | 11/1973 | Chandler, Jr. | 307/203 |
| 3,805,168 | 4/1974 | Marchand et al. | 307/218 |
| 3,820,007 | 6/1974 | Schilling et al. | 307/297 |
| 4,038,562 | 7/1977 | Kintner | 307/203 |

*Primary Examiner*—Stanley D. Miller, Jr.

[57] ABSTRACT

A logic circuit comprises a serially connected circuit structure and a wired OR connected circuit structure of unit circuits, each of which is composed of logic elements and equivalent to a relay contact. The respective unit circuit is connected with associated equipment in a manner similar to that used in connecting relay contacts, on a base of a circuit diagram, whereby a logic circuit equivalent to the relay contact circuit is formed.

3 Claims, 21 Drawing Figures

112a
112b
112c
112d
101a
101b
101c
101d
100a
100b
100c
100d
109a
109b
109c
109d
110
111
102
103
104
105
106
107
108
113a
113b
114a
114b
115a
115b
R1
R2
R3
R4
R5
R6
R7
R8
R9
R10
R11
R12
R13
C1
C2
C3
C4
C5
C6
C9
+5V
Q1
R14
ZD
C7
C8
121
120

LOGIC CIRCUIT EQUIVALENT TO A RELAY CONTACT CIRCUIT

Matter enclosed in heavy brackets [ ] appears in the original patent but forms no part of this reissue specification; matter printed in italics indicates the additions made by reissue.

BACKGROUND OF THE INVENTION

This invention relates to a logic circuit and more particularly to a contactless logic circuit equivalent to a relay contact circuit, which can be connected on the basis of a circuit diagram similar to the connections of relay contacts.

In carrying out a certain sequential control, a conventional system often uses relays which rely on mechanical closing or opening of relay contacts. This system has several defects such as the occurrence of frequent relay failures, short operating life, and the need for continual maintenance and inspection services. In recent years, there has been a tendency for relay contact systems to be gradually replaced by contactless electronic logic circuits employing semiconductor elements, which have functions equivalent to those of the conventional relay contact system.

In rewriting a control sequence to carry out the operation equivalent to that of a relay contact circuit in terms of a conventional logic circuit, there arises the need for employing particular logical circuit symbols which are entirely different from the symbols used in circuits using relays. Consequently, engineers or field operators who have become conversant with the conventional relay contacts symbols are confronted with the necessity of acquiring knowledge of entirely new and unfamiliar logical symbols and of their interpretations.

In translating a control sequence for a conventional relay contact circuit into that for a logic circuit, a conventional circuit diagram must be rewritten into an entirely new and unique one. In translating, the risk of errors in the sequential composition in quite conceivable.

Even if a circuit for realizing a certain sequence has been composed with a conventional logic circuit, such a logic circuit will have the defect of poor operational reliability due to noise that may be introduced into the circuit from the outside.

Various circumstances, as above mentioned, have been great obstacles for the transfer of the conventional logic system containing mechanical contacts into the contactless logic system.

Further, where a contactless control sequence is to be set up by use of conventional logic circuit boards, there arises the necessity of preparing at least three kinds of different boards, namely, AND element boards, OR element boards, and inverter element boards. These circuit boards must be mutually interconnected. The need for preparation of numerous kinds of boards invariably makes the circuit structure complex and space requirements become bulkier.

SUMMARY OF THE INVENTION

Accordingly, it is a general object of this invention to provide a new and useful logic circuit in which the difficulties and defects of the conventional logic circuit designs have been overcome.

Another object of this invention is to provide a logic circuit capable of setting up a control sequence having a function equivalent to that of a relay sequence, with a contactless logic system, by suitably combining unit circuits with reference to a circuit diagram similar to that of a conventional relay contact circuit. By employing the logic circuit design, according to this invention, electronic engineers and field operators are relieved of the burden of becoming skilled in treating symbols, expressions, etc., characteristic of the logic circuits. A logic circuit control sequence can be set up by those who have knowledge of only conventional relay contact circuit diagrams.

Still another object of this invention is to provide a circuit structure capable of realizing a relay sequence with a logic circuit which employs a plurality of logic circuit boards of only one kind.

A further object of this invention is to provide a logic circuit, free from erroneous operation despite the presence of external noise. To attain this object, a DC stabilized power supply circuit is installed on each circuit board. It is desirable that negative logic be used for interstage connection between AND elements.

A further object of this invention is to provide a logic circuit of a circuit block section corresponding to a relay which operates as an A-contact type (normally open contacts), a B-contact type (normally closed contacts), or a combined A- and B-contact type relay, by proper selection and interconnection of prescribed terminals.

A further object of this invention is to provide a logic circuit capable of simply interlocking circuit operations in each of units of circuit block sections corresponding to relays.

A still further object of this invention is to provide a logic circuit capable of use as a timer for imparting a delay to the circuit operation by adding thereto a capacitor with a suitable capacitance value.

These and other objects and further features of this invention will become apparent from a consideration of the following detailed description taken in conjunction with the accompanying drawings.

DETAILED DESCRIPTION

A basic circuit structure embodying the concept of a logic circuit according to this invention will first be described.

Figure 1A:
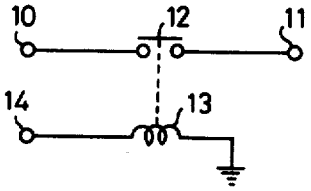
FIGS. 1A and 1B are diagrams illustrating respectively a relay contact circuit and a basic structure of a unit circuit of a logic circuit corresponding thereto.

FIG. 1A shows a conventional relay circuit containing one relay contact. A relay contact 12 is connected between an input terminal 10 and an output terminal 11. This contact is closed upon energization of a relay coil 13 responsive to a signal applied to a control input terminal 14. In the presence of a signal on the input terminal 10 when the relay contact 12 is closed, the signal can be derived from the output terminal 11.

Figure 1B:
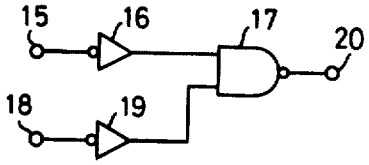

A logic circuit of this invention, equivalent to the relay contact circuit shown in FIG. 1A (which may be hereinafter referred to simply as a unit circuit), is illustrated in FIG. 1B. The unit circuit has a basic structure for applying a signal fed to an input terminal 15 to one input of an AND element 17 (hereinafter referred to as the AND element, because although the illustrated element is strictly a NAND element, it is yet a kind of AND element). The signal from terminal 15 is applied through an inverter 16, while a control signal supplied to an input terminal 18 is applied to the other input of the AND element 17 through an inverter 19. Hence, there is a logical product (AND), deriving the output from an output terminal 20.

Where the control input voltage applied to the control terminal 18 is high (hereinafter referred to as the H level), the control input is converted into a low voltage (hereinafter referred to as the L level) by the inverter 19 before application to one input of the AND element 17. The result is that the output of the AND element 17 is always at the H level no matter whether the signal level on the signal input terminal 15 is high or low. This state is equivalent to the circuit of FIG. 1A when the relay contact 12 is open.

On the other hand, when the control input on the control input terminal 18 is at the L level, the control input is applied through the inverter 19 so one input of the AND element 17 as a H level input. Therefore, a signal from the input terminal 15 is applied as an input to the AND element 17 through the inverter 16. This signal passes through the element 17, as it is, to appear as the output at the output terminal 20. This state is equivalent to an operation of the relay circuit of FIG. 1A, when the contact 12 is closed.

Figure 2A:
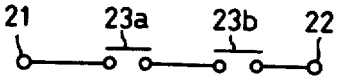
FIGS. 2A, 2B, and 2C are diagrams illustrating respectively a relay circuit in which two relay contacts are serially connected, a circuit expressed by the conventional logical symbol so as to be equivalent to the relay contact circuit, and a logic circuit composed of two unit circuits according to this invention.
Figure 2B:
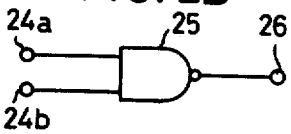

The circuit in which two relay contacts 23a and 23b are serially connected between input and output terminals 21 and 22, as shown in FIG. 2A, may be represented by a logic circuit, as shown in FIG. 2B. The circuit of FIG. 2B contains input terminals 24a and 24b and an AND element 25, in terms of the conventional logic symbol. Only when both relay contacts 23a and 23b are closed, that is, when signals are applied to both input terminals 24a and 24b, the output can be derived from an output terminal 26.

Figure 2C:
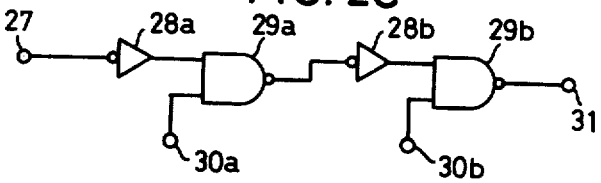

When the relay contact circuit shown in FIG. 2A is rewritten by the use of the unit circuits, the circuit shown in FIG. 2C is obtained. That is, the unit circuit consisting of inverter 28a and an AND element 29a and the unit circuit consisting of an inverter 28b and an AND element 29b correspond respectively to the relay contact 23a and the relay contact 23b. Further, the two unit circuits are connected in series. Thus an input signal applied to an input terminal 27, is derived from an output terminal 31 as an output only when signals are applied to both input terminals 30a and 30b.

Figure 3A:
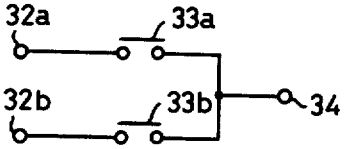
FIGS. 3A, 3B, and 3C are diagrams illustrating respectively a relay circuit in which two relay contacts are connected in parallel, its equivalent circuit represented by the conventional logical symbol, and a logic circuit structure composed of unit circuits according to this invention.

Further, a circuit comprising input terminals 32a and 32b, an output terminal 34, and two relay contacts 33a and 33b, connected in series as shown in FIG. 3A, can be represented by a logic circuit consisting of an OR element 36 and input terminals 35a and 35b, in terms of the conventional logical symbol. When at least one of these contacts 33a and 33b is closed, that is, when a signal is applied to either input terminal 35a or 35b, an output can be derived from an output terminal 37.

Figure 3C:
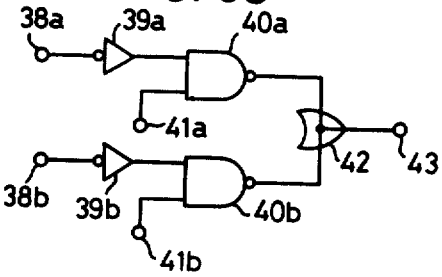
Figure 3B:
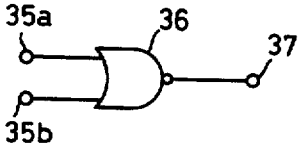

When the relay contact circuit shown in FIG. 3A is rewritten by the use of the unit circuits of this invention, the circuit of FIG. 3C is obtained. It is seen in this circuit that two unit circuits are connected in parallel. One unit circuit comprises input terminals 38a and 41a, an inverter 39a, and an AND element 40b and the other comprises input terminals 38b and 41b, an inverter 39b, and an AND element 40b. Then, both outputs of these AND elements 40a and 40b are connected to form a wired OR circuit 42 and, further, to an output terminal 43.

According to the logic circuit design concept of this invention, the unit circuit shown in FIG. 1B as a basic structure is considered in much the same way as one relay contact. Connection is made according to a circuit diagram similar to that of a conventional relay contact circuit. Then a control sequence for the relay contact circuit can easily be accomplished with a logic circuit.

Figure 4A:
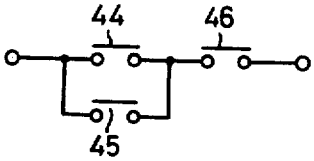
FIGS. 4A and 4B are diagrams illustrating respectively a relay circuit in which two relay contacts are connected in parallel and another relay contact is serially connected to this parallel connection, and an equivalent logic circuit composed of unit circuits according to this invention.
Figure 4B:
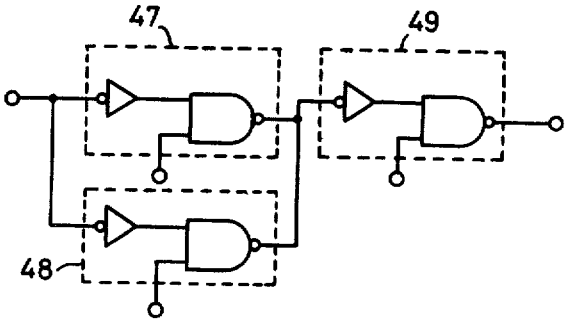

As will be readily understood from the foregoing description, the circuit shown in FIG. 4A comprises two relay contacts 44 and 45 connected in parallel and a relay contact 46 connected in series therewith. This circuit may be represented by the logic circuit of FIG. 4B. It is seen that the logic circuit comprises two unit circuits 47 and 48 connected in parallel, each having the basic structure shown in FIG. 1B and another unit circuit 49 having an input is serially connected to the wired OR circuit of the parallel unit circuits 47 and 48.

Since the two AND elements of this circuit are connected with negative logic therebetween, the circuit is scarcely effected by any external noise in the course of signal transmission. The possibility of erroneous operation caused by noise can be eliminated. A further advantage of this circuit is that when a semiconductor element constituting a unit circuit is damaged, the final output assumes the L level. This situation may be likened to the opening of relay contacts in the relay contact circuit. Thus, the circuit driven by an output signal of the logic circuit remains open, and operational safety can be assured.

Figure 5B:
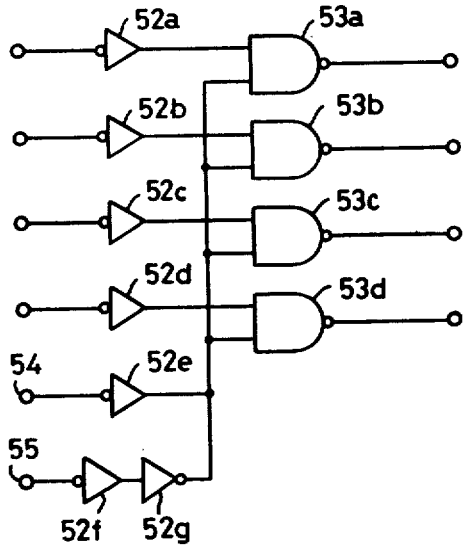
FIGS. 5A and 5B are diagrams illustrating respectively a relay circuit containing four relay contacts connected in parallel and a basic structure of a logic circuit of this invention equivalent to the relay circuit.
Figure 5A:
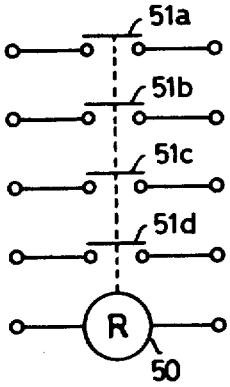

FIG. 5A shows a most common relay structure including one relay coil 50 and four relay contacts 51a, 51b, 51c, and 51d, which open or close in response to the energization or deenergization of the coil 50. In order to provide an equivalent of this organization, a relay logic circuit block is constructed by using four inverters 52a, 52b, 52c, and 52d and four AND elements 53a, 53b, 53c and 53d as shown in FIG. 5B. One or two circuit blocks of this circuit structure are installed on a single circuit board according to this invention.

Further, to one input of each of the AND elements 53a through 53d is applied a gate drive signal D, from a terminal 54. This drive signal is applied through an inverter 52e or a gate drive signal D may be applied from a terminal 55 through inverters 52f and 52g. In order to obtain a circuit equivalent to the A-contact (normally open contact) type relay as shown in FIG. 5A, the signal $\overline{D}$ should be applied from the terminal 54. In order to obtain a circuit equivalent to the B-contact (normally closed contact) type, the signal D should be applied to the terminal 55.

Figure 6:
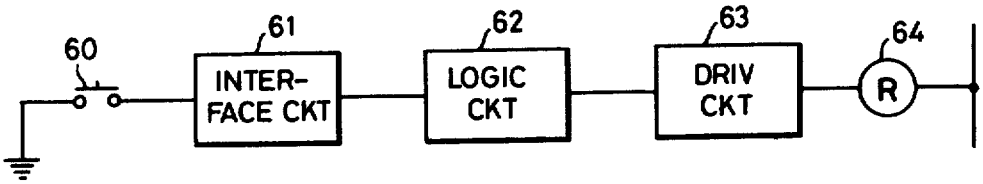
FIG. 6 is a schematic block diagram of an overall system incorporating a logic circuit according to this invention.

FIG. 6 shows a schematic block diagram of an overall system in which a sequence of logic circuits of this invention has been actually reduced to practice. As illustrated in FIG. 6, an external operation switch 60, with one side grounded, is connected to a logic circuit 62 of this invention via an interface circuit 61 which eliminates chatter, noise, etc. for the transfer of a signal to the next stage.

The logic circuit 62 is composed of a plurality of circuit boards of only one kind, with their terminals interconnected. Each circuit board mounts one of the circuits shown in FIG. 5B. The output of the logic circuit 62 is amplified by a driving circuit 63. A relay 64 is driven by the amplified driving current to operate a predetermined objective unit (not shown). The relay 64 may be replaced by a lamp, TRIAC (Triode AC Switch), or an AC circuit, for example, depending on applications of this system.

Figure 7A:
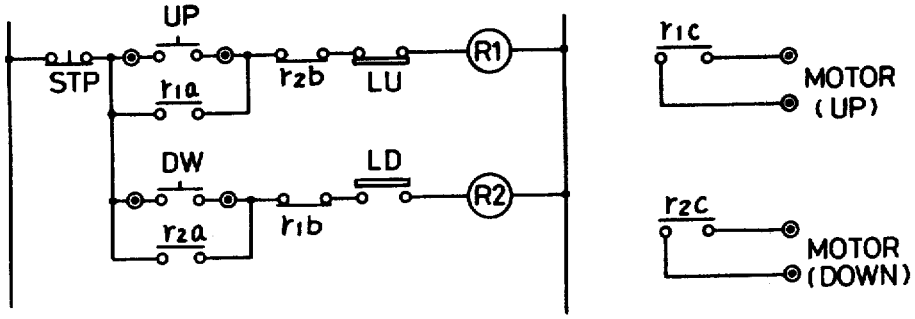
FIGS. 7A, 7B, and 7C are diagrams illustrating respectively a relay contact circuit capable of carrying out an examplary up-and-down movement control sequence of a motor-operated shutter, a corresponding logic circuit represented by the conventional logical symbol (MIL standard), and a corresponding logic circuit according to this invention.

For instance, an example of an up-and-down movement control circuit for a motor-operated shutter can be represented by a conventional relay contact circuit as shown in FIG. 7A. The symbol STP denotes a stop button switch; UP and DW denote respectively push-button switches for up and down movement; LU and LD denote respectively limit switches for up and down movement; R1 and R2 denote relay coils; r1a, r1b, and r1c each denote relay contacts corresponding to the relay coil R1; and r2a, r2b, and r2c each denote relay contacts corresponding to the relay coil R2.

Figure 7B:
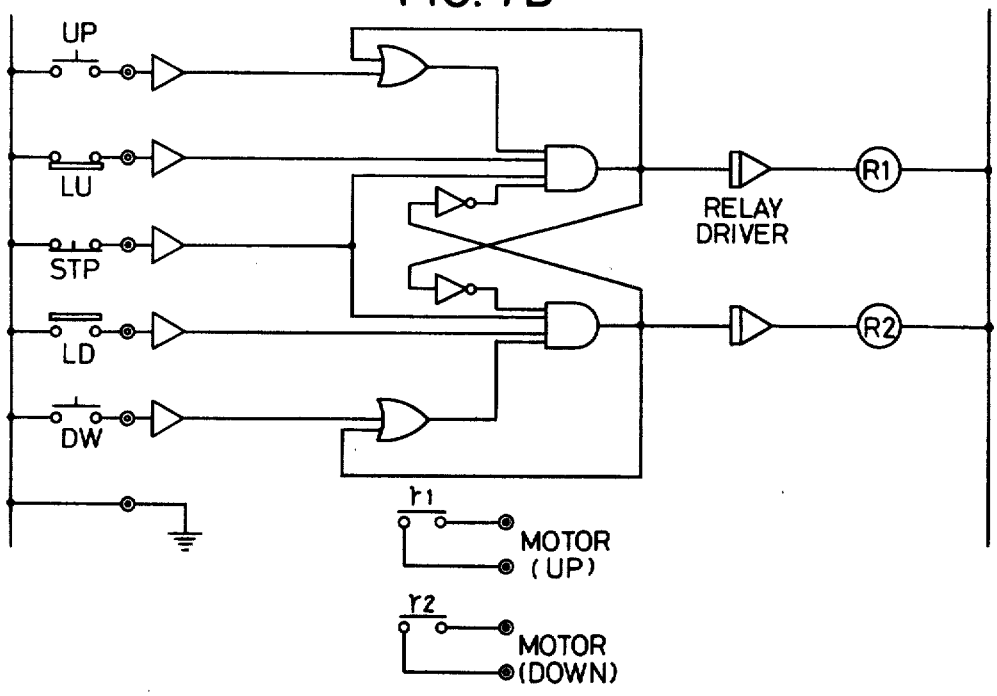

The sequence of the relay circuit shown in FIG. 7A may be expressed in terms of the conventional logical symbol by a logic circuit as shown in FIG. 7B. Since the circuit shown in FIG. 7B is quite different from the circuit shown in FIG. 7A, this circuit will appear to be quite unfamiliar to those who have handled conventional relay contact circuit.

Figure 7C:
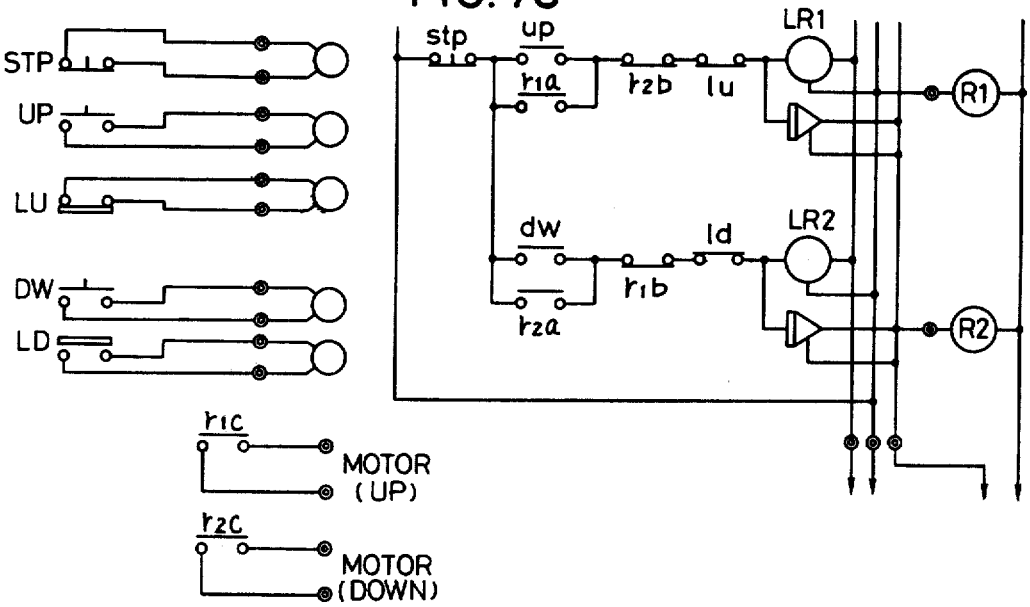

On the other hand, the sequence shown in FIG. 7A can also be expressed in terms of the logical circuit symbols, by a drawing as shown in FIG. 7C. In this way, the circuit diagram can be drawn in a manner which is similar to the relay contact circuit shown in FIG. 7A. The required logic circuit which provides the same sequence as the circuit of FIG. 7A can be realized by merely interconnecting the logic circuit board terminals by making reference to the circuit diagram of FIG. 7C.

An embodiment of a logic circuit board which facilitates the logic circuit structure according to this invention will now be described.

Figure 8A:
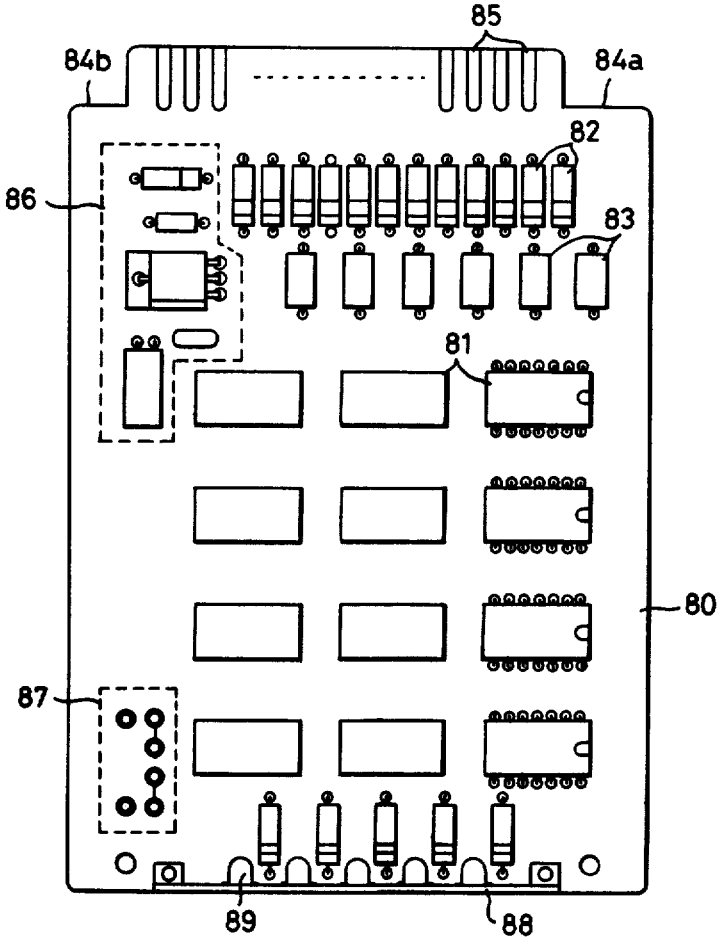
FIGS. 8A and 8B are respectively a plan and a front view of a circuit board for constituting a logic circuit according to this invention.
Figure 8B:
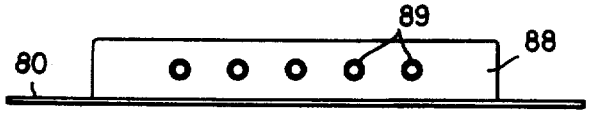

FIGS. 8A and 8B show respectively a top plan view and front view of one embodiment of a logic circuit board according to this invention. It is seen that on a circuit base board 80, a plurality of IC packages 81, resistors 82, and capacitors 83 are respectively installed to form a logic circuit equivalent to two 4-contacts-relays. At the leading edge of the base board 80, there are two notches 84a and 84b of different dimensions as illustrated to ensure unmistakable orientation and plug-in operation of the board when it is inserted into a rack. An array of terminals 85 is provided at the leading edge of the board 80 for connection to the corresponding connectors (not shown).

A part 86 (encircled by the dotted line) is a DC stabilized power supply circuit provided on each circuit base board. In a case where only one stabilized power supply circuit is commonly provided for a plurality of boards, erroneous operation of the logic circuits may caused by external noise introduced in a power line extending between the stabilized power supply circuit and each circuit board. With the circuit board structure according to this invention, however, a stabilized power supply circuit is installed on each circuit board, in the vicinity of a logic circuit, whereby there is no possibility of erroneous operation due to the introduction of the external noise.

A part 87 encircled by the doted line represents a contact altering module section. By reconnecting each module, the logic circuit can be altered so as to provide an operation equivalent to the A, B, or A-B type relay contact as will be described later.

On the front face of the circuit board 80, there is a designation plate 88 on which are mounted light emitting diodes 89, for visually indicating that the power supply, the first relay logic circuit, the second relay logic circuit, etc., are normally operating. Therefore, for maintenance inspection, all that is needed is to check whether these diodes emit light. No special instruments for inspection are required. Thus, maintenance service becomes extremely easy.

In actual use, this circuit board is inserted vertically into a rack so that the right and left sides of the board in FIG. 8A will become the top and bottom sides, respectively.

Figures 9, 10, 11:
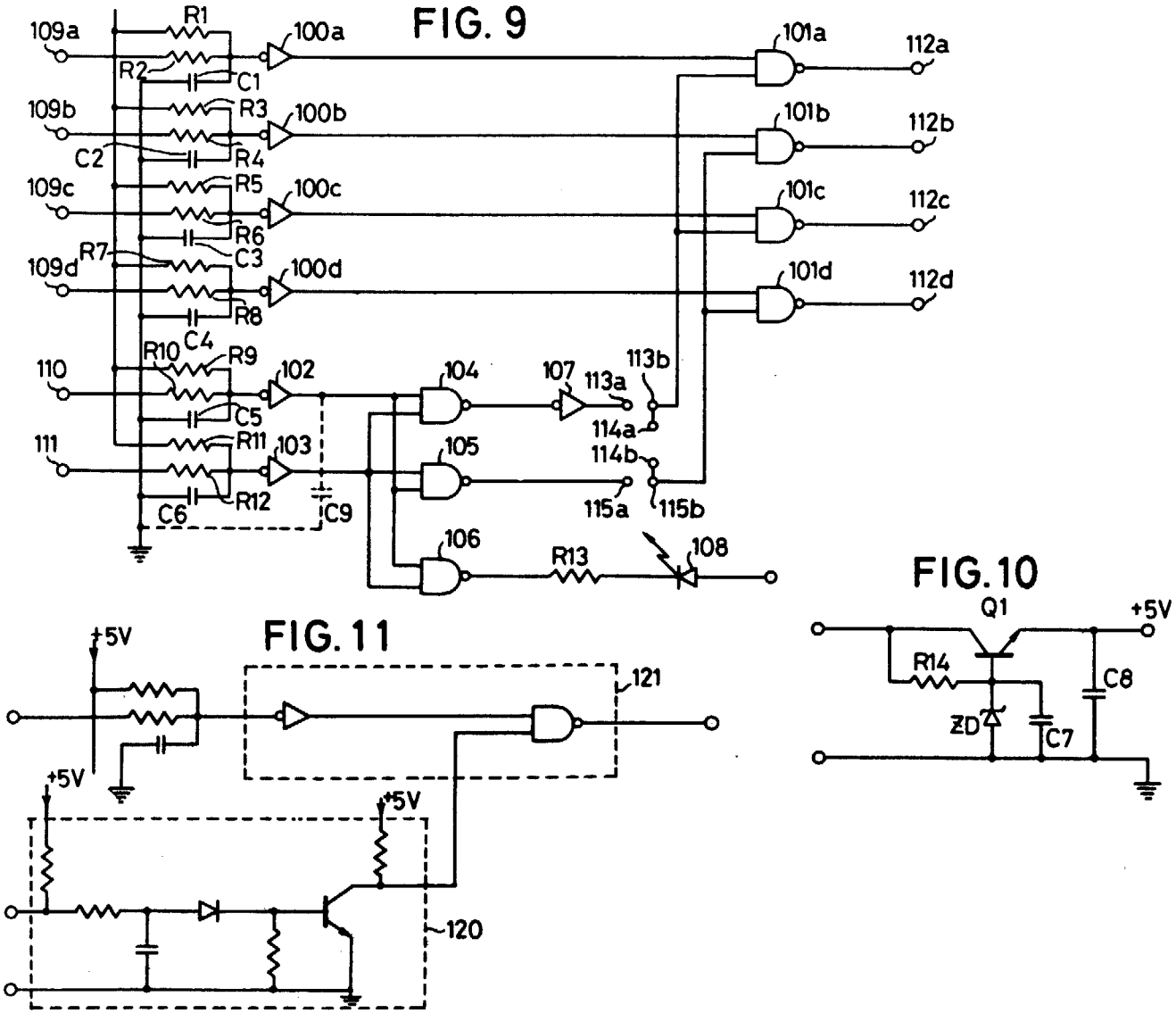
FIG. 9 is a circuit diagram of one embodiment of a logic circuit installed on such a circuit board which is equivalent to a conventional relay.
FIG. 10 is a circuit diagram of an example of a DC stabilized power supply circuit installed on the circuit board.
FIG. 11 is a circuit diagram of one embodiment of an interface circuit interposed between a logic circuit of this invention and external contact means.

FIG. 9 is a circuit diagram of a relay logic circuit equivalent to a 4-contacts-relay installed on the above-mentioned circuit board. This circuit provides a more practical circuit than the circuit schematically illustrated in FIG. 5B.

It is seen that a relay logic circuit equivalent of four relay contacts is formed by inverters 100a through 100d and by AND elements 101a through 101d. In operating this circuit, a signal applied to a terminal 110 is fed to one input of each of AND elements 104, 105, and 106 via an inverter 102. A signal applied to a terminal 111 is fed through an inverter 103 to the other input of each of the AND elements 104, 105, and 106. The output of an AND element 104 is applied to a terminal 113a through an inverter 107. A terminal 113b is connected to one input of each of the AND elements 101a and 101c and to a terminal 114a. The output of the AND element 105 is connected to a terminal 115a, while a terminal 115b is connected to one input of each AND element 101b and 101d and also, to a terminal 114b.

These terminals 113a, 113b, 114a, 114b, 115a, and 115b correspond to each module in the module section 87 in FIG. 8A.

In the presence of signals on both terminals 110 and 111, the output is produced from each of the AND elements 104, 105, and 106, and a driving signal is fed to one input of each of the AND elements 101a through 101d. When there is a need for rapidly suspending the circuit operation, it is only necessary to remove the signal on the terminal 111. Then no output is produced from each of the AND elements 104 through 106. Thereafter, no driving signal goes to any of the AND elements 101a through 101d. As a result, no output appears from any of the output terminals 112a through 112d of the AND elements 101a through 101d irrespective of whether or not a signal is present at input terminals 109a through 109d. In other words, the circuit operation is suspended and interlocked. For this result, the terminal 111 is utilized for interlocking operation.

During normal operation of the circuit, the AND element 106 also develops an output, whereby a light emitting diode 108 (corresponding to diodes 89 in FIGS. 8A and 8B) lights to visually indicate normal operation.

The manner in which the above described relay logic circuit should be used depending on the kind of relay contact of the relay containing four relay contacts will be described. In order to make the circuit operate in the same manner as a relay of the A-contact type (normally open contact), connection should be made between the terminals 113a and 113b and between the terminals 114a and 114b. Then the output of the inverter 107 will be applied to one input of each of the four AND elements 101a through 101d.

In order to make the circuit operate in the same manner as a relay of the B-contact type (normally closed contact), a connection should be made between the terminals 115a and 115b and between the terminals 114a and 114b. Then the output of the AND element 105 will be applied to one input of each of the four elements 101a through 101d.

Similarly, in order to operate the circuit in the same manner as a relay of the A-B contact type having two normally open contacts and two normally closed contacts, connection should be made between the terminals 113a and 113b and between the terminals 115a and 115b. Then the output of inverter 107 will be applied to one input of each of the two AND elements 101a and 101c, while the output of the AND element 105 will be applied to one input of each of the two AND elements 101b and 101d.

Incidentally, the DC stabilized power supply circuit part 86 shown in FIG. 8A comprises a well-known, general circuit composed of a transistor Q1, a resistor R14, a zener diode ZD, and capacitors C7 and C8, as shown in FIG. 10.

In order to fabricate a logic circuit with a prescribed sequence of circuit operations, by the use of a plurality of circuit boards and an interconnection of the unit circuits, each equivalent to a pair of relay contacts, one by one, it is only necessary that some desired ones (corresponding to the terminals to be interconnected) of the pins projecting from the rear of the connectors into which the terminal section 85 has been inserted be optionally connected by some suitable means such as wire-wrapping, soldering, etc.

Incidentally, the logic circuit shown in FIG. 9 may be operated as a timer. A delay can be imparted to its logic operation by additionally connecting a separate capacitor C9, having a desired capacitance value, between the output of the inverter 102 and ground as indicated by the dotted line.

The interface circuit to be installed between the external switching contacts and the logic circuit comprises a known, general interface circuit 120 and a unit circuit 121 as shown in FIG. 11. It is possible, by this circuit, to transfer a signal to the non-contact type logic circuit with the elimination of the external switching contacts completely eliminated. It is to be understood that the same stablized power supply circuit as illustrated in FIG. 10 is installed on the interface circuit board.

In the embodiment shown in FIG. 8A two logic circuits, each equivalent to a relay having four contacts, have been installed on a single circuit board by using a plurality of IC packages 81; however, the two relay logic circuits may be formed within a single IC package, as required.

Further, several interface circuits ranging in number from four to eight, for example, could be formed in a single IC package. It would also be feasible to form the DC driver circuits within a single IC package.

While all of the foregoing embodiments are concerned with logic circuits composed of semiconductor elements, it will be obvious to those skilled in the art that fluidic logic elements (fluidic device) may be substituted for the semiconductor elements in fabricating a logic circuit according to this invention.

Further, this invention is not limited to these embodiments but various variations and modifications may be made without departing from the scope and spirit of the invention.

What is claimed is:

[1. A logic circuit comprising a plurality of unit circuits which are connected with each other in first and second connection types, each of said unit circuits comprising an AND element having at least two input terminals and an inverter element connected to one input of the AND element, each of said unit circuits being equivalent to one relay contact in operation, said first connection type being a connection type in which the output of the AND element of one unit circuit is connected to the output of the AND element of another unit circuit to form a wired OR connection whereby a circuit construction for carrying out an OR logical operation of unit circuits is formed, said second connection type being a connection type in which the output of the AND element of one unit circuit is connected to the input of the inverter element of another unit circuit, said other input terminal of said AND element of said unit circuits being connected to a signal source, whereby a circuit construction for carrying out an AND logical operation of unit circuits is formed, the all unit circuits being respectively connected with each other in the same sequence as the relay contacts.]

[2. A logic circuit according to claim 1 which further comprises circuit means for applying a driving signal to the other input of the AND element of the respective unit circuit, said driving signal being equivalent to a driving signal to energize a relay coil for driving the relay contact in operation.]

[3. A logic circuit according to claim 2 wherein said driving signal applying circuit means includes AND elements for operating responsive to a coincidence between incoming signals through two input terminals, and said driving signal applying circuit means being constructed to switch off each of said unit circuit means by removing the signal from one of said two input terminals at the time of interlocking.]

[4. A logic circuit according to claim 2 which further comprises time delay means including a separate capacitor connected to said driving signal applying circuit means to impart a time delay to the operation of the logic operation.]

[5. A logic circuit according to claim 1 which is constructed by using a plurality of circuit boards of one kind, each of the boards being provided with a plurality of said unit circuits and input and output terminals of said unit circuits, said first connection type being obtained by connecting the output terminals with each other on the same boards, and said second connection type being obtained by connecting the output terminals of one board with the input terminals of another board.]

[6. A logic circuit according to claim 5 wherein each of said plurality of circuit boards is provided with a DC stabilized power supply circuit for use in supplying the power only for unit circuits installed on the same circuit board.]

[7. A logic circuit according to claim 1 further comprising an interface circuit means connected to an external mechanical switch contact and to one input of the AND element of the unit circuit which is in the first stage among the unit circuits, said interface circuit supplying a signal of the switch contact to the AND element after eliminating chattering of the signal.]

*8. A logic circuit comprising a plurality of circuit board means of one kind, each of the boards having a plurality of unit circuits, each including input and output terminals, and means comprising a DC stabilized power supply circuit mounted on each of said circuit board means for supplying power to only those of said unit circuits which are installed on the same circuit board, each of said unit circuits comprising an AND element having at least two input terminals and an inverter element connected to one input of the AND element, each of said unit circuits being equivalent to one relay contact, said unit circuits being connected in a first connection type in which the output of the AND element of one unit circuit is connected to the output of the AND element of another unit circuit to form a wired OR connection whereby a logical OR circuit is formed, said first connection type being obtained by connecting the output terminals with each other on the same boards, said unit circuits being connected in a second connection type in which the output of the AND element of one unit circuit is connected to the input of the inverter element of another unit circuit, said other input terminal of said AND element of said unit circuits being connected to a signal source, whereby a logical AND circuit is formed, said second connection type being obtained by connecting the output terminals of one board with the input terminals of another board, all unit circuits being respectively connected with each other in the same sequence as relay contacts by an interconnection of a plurality of the circuit board means of one kind.*

*9. A logic circuit according to claim 8 and negative logic means connected between said AND elements of the unit circuits.*

*10. A logic circuit according to claim 8 wherein each of the boards further comprises a terminal group including a plurality of terminals connected to the other terminals of said AND elements, and means for supplying two kinds of inputs to the terminal group, said terminals of the terminal group being selectively connected with each other whereby either one kind of input is supplied to the other terminal of the AND elements so that the unit circuits are selectively equivalent to normally open or normally closed relay contacts.*

* * * * *